United States Patent
Aldred et al.

[11] Patent Number: 6,046,985
[45] Date of Patent: Apr. 4, 2000

[54] COMMUNICATION SYSTEM WITH EXCHANGE OF CAPABILITY INFORMATION

[75] Inventors: Barry Keith Aldred, Winchester; Howard Shelton Lambert, Southampton; Harry David Mitchell, Richmond-upon-Thames; David Seager Renshaw, Winchester; Graham Hugh Tuttle, Southampton, all of United Kingdom

[73] Assignee: International Business Machines Corporation, Armonk, N.Y.

[21] Appl. No.: 08/838,553

[22] Filed: Apr. 9, 1997

[30] Foreign Application Priority Data

Apr. 10, 1996 [GB] United Kingdom .................... 9620699

[51] Int. Cl.$^7$ .......................... G01R 31/08; G08C 15/00; H04J 1/16; H04L 1/00
[52] U.S. Cl. ............................................. 370/252; 370/236
[58] Field of Search ...................................... 370/252, 231, 370/234, 253, 392, 395, 397, 399, 400, 401, 408, 409, 411, 420, 508, 516, 517, 519, 904, 905, 230, 232, 235, 236, 278, 282, 315, 319, 347, 349, 406, 419, 421, 423, 424, 432

[56] References Cited

U.S. PATENT DOCUMENTS

| | | |
|---|---|---|
| 5,274,625 | 12/1993 | Derby et al. . |
| 5,280,483 | 1/1994 | Kamoi et al. . |
| 5,335,222 | 8/1994 | Kamoi et al. . |
| 5,341,366 | 8/1994 | Soumiya et al. . |
| 5,357,507 | 10/1994 | Hughes et al. . |
| 5,367,523 | 11/1994 | Chang et al. ............................ 370/235 |
| 5,408,465 | 4/1995 | Gusella et al. ........................... 370/231 |
| 5,434,848 | 7/1995 | Chimento, Jr. et al. . |
| 5,548,579 | 8/1996 | Lebrun et al. ........................... 370/216 |
| 5,600,638 | 2/1997 | Bertin et al. ............................. 370/351 |
| 5,600,641 | 2/1997 | Duault et al. ............................ 370/400 |
| 5,600,794 | 2/1997 | Callon ................................... 364/284.3 |
| 5,634,006 | 5/1997 | Baugher et al. ......................... 370/229 |
| 5,649,108 | 7/1997 | Spiegel et al. ...................... 395/200.71 |
| 5,809,501 | 9/1998 | Noven .................................... 707/104 |
| 5,818,815 | 10/1998 | Carpentier ................................ 370/218 |
| 5,831,975 | 11/1998 | Chen et al. .............................. 370/256 |
| 5,893,128 | 4/1999 | Nauckhoff ................................ 707/511 |

FOREIGN PATENT DOCUMENTS

| | | | |
|---|---|---|---|
| 0658999 | 6/1995 | European Pat. Off. | ........ H04L 12/56 |
| 2285196 | 6/1995 | United Kingdom | ............ H04L 12/56 |

OTHER PUBLICATIONS

"Patents Act 1977: Search Report Under Section 17(5)", Keith Williams, Dec. 18, 1996.

*Primary Examiner*—Dang Ton
*Assistant Examiner*—Phirin Sam
*Attorney, Agent, or Firm*—Jerry W. Herndon

[57] ABSTRACT

A communications system may be used for transmitting and/or receiving data over a network. The system needs to exchange capability information with other systems in the network, in order to determine which forms of communication can be mutually supported. The exchange of information includes logical expressions involving two or more parameters. This allows, for example, a system to indicate that a higher error rate will occur if the throughput is increased. In the preferred embodiment, each capability parameter is specified in terms of a range between a minimum and a maximum acceptable value.

10 Claims, 1 Drawing Sheet

6,046,985

COMMUNICATION SYSTEM WITH EXCHANGE OF CAPABILITY INFORMATION

TECHNICAL FIELD

The present invention relates to communications systems, and in particular to exchanging information concerning the capabilities provided by such communications systems.

BACKGROUND OF THE INVENTION

Parameters such as bandwidth, latency, jitter, and error rate etc are collectively referred to as quality of service (QoS) parameters. Many networks provide users or applications with a mechanism to indicate their desired quality of service. For example, under the Internet Protocol, datagrams contain three bits, denominated D, T, and R, which if set request low delay (latency), high throughput, and high reliability (ie low error rate) respectively (see "Internetworking with TCP/IP; Principles, Protocols, and Architecture" by D Comer, Prentice Hall, 1988, section 7.7.4). The Internet does not guarantee to satisfy these requests, but may be influenced by them in its route selection.

In networks having many nodes, the quality of service parameters for a given communication are generally determined for the network path or route as a whole. For example, error rate and latency typically need to be summed along the relevant path. The matching of quality of service parameters across multiple nodes of a network is discussed in U.S. patent application Ser. No. 08/407,993, filed Mar. 21, 1995, and assigned to the same assignee as the present application.

Determination of quality of service across a network can be important for route selection in a network for which multiple routes exist between a given source and destination node. U.S. Pat. No. 4,905,233 discloses the selection of a route based on a link metric which is calculated from the current data rate, the link capacity (both in packets per second), and delay over the link.

Quality of service issues are particularly pertinent to networks based on asynchronous transer mode (ATM) technology, which are intended to handle a variety of forms of communications including conventional computer data transfers, and also multimedia communications. ATM technology is based on transmitting data in small packets, known as cells. Unlike most current networks, ATM networks do not provide any error detection or correction on individual cells, or any flow control. This makes ATM networks very fast, but places greater responsibility onto the applications at either end of the communication, and also on the call set-up phase. For example, the lack of flow control implies that at peak traffic rates there is the possibility of increased cell loss, if input buffers overflow.

Quality of service issues relevant to ATM and other technologies have been widely discussed in the prior art. U.S. Pat. Nos. 5,070,498, 5,335,222 and 5,432,790 describe a determination made by an ATM switch as to whether a new call of specified average and peak rate can be supported by the switch without detriment to the other calls on the switch, by determining a loading function. This approach is extended to multiple priority levels in U.S. Pat. No. 5,357,507, by calculating upper and lower call acceptance planes in a multi-dimensional space in terms of the number of calls in each of the priority levels. The use of multiple priority levels is also disclosed in GB 2285196 and U.S. Pat. No. 5,434,848. A somewhat different technique is used in U.S. Pat. No. 5,408,465, where the extra traffic that a call would cause is simulated, to determine whether or not the call can be accepted by the network. EP-A 658999 describes a call admission policy based on different classes of traffic. In "Integrated Packet Networks with Quality of Service Constraints" by W Lee and P Kamat, p223–227, IEEE Globecom '91, a mechanism is described whereby users or applications can request quality of service for a particular parameter by specifying two values, one representing the the desired or requested value, whilst the other represents the lowest acceptable value.

EP-A-621704, EP-A-632672, and EP-A-583965 illustrate the application of quality of service criteria to network technologies other than ATM, in particular to local area networks (LANS) and to fiber distributed data interface (FDDI) networks.

In many situations it is not only the link capabilities which must be verified, but also those of the sending and receiving nodes, plus intermediate nodes if appropriate. An example of this is disclosed in EP-A-494576, in which a compressed data message is to be sent between a source and target node. Prior to sending the data message, a set-up message is sent from the source node to the target node, and then back again, to confirm the level of compression supported by the source node, target node, and intermediate nodes. This message exchange represents a simple form of capability negotiation across the network.

Similar forms of capabilities negotiation are disclosed in U.S. Pat. No. 5,258,983 to set up a communication involving at least one intermediate node, and are also defined for example in ITU standard H.242, which describes a mechanism for establishing communications between audiovisual terminals using digital channels as part of the H.320 series of standards.

Whilst the above prior art illustrates that quality of service and capabilities negotiation are very important features of modern communications systems, the inventors of the present application have nevertheless recognised deficiencies that are becoming particularly significant in the emerging multimedia communications technologies.

SUMMARY OF THE INVENTION

Accordingly, the invention provides a communications system for transmitting and/or receiving data over a network including a plurality of nodes, whereby nodes may exchange information about their capabilities to support various communications, characterised in that said capability information includes at least one logical expression involving at least two or more inter-related parameters.

The invention recognises that the capability parameters are all inter-related. For example, in ATM, the error rate depends on the cell rate, since at high cell rates buffer overflow can occur. Whilst such dependencies per se are well-known in the prior art, this has not been reflected in the capability information exchanged between nodes. Rather, capability information has always been transmitted separately on the different parameters (sometimes in parallel).

In a preferred embodiment, the capablity information includes a specification of the quality of service parameters provided by a node, for example linking data transmission rate, error rate and latency, and the communications system further comprises means for receiving a requested quality of service from an application intending to initiate data communications over said network, and for using said capability information for comparing the requested and available quality of service in order to determine whether or not the intended data communications can be supported by the network. Using logical expressions to represent the available quality of service from the network allows better matching with the requested quality of service, and so helps to improve overall efficiency of network usage.

In the preferred embodiment, each quality of service parameter is represented as a pair of values corresponding to the minimum and maximum of the range for that parameter. It will be appreciated that in theory one might wish to specify additional information about each quality of service parameter, such as quartile figures, or even the complete statistical distribution, but in general this is prohibitive in terms of the necessary mathematical and computational processing. The use of minimum/maximum pairs provides a more effective representation than the use of a single average figure for example, whilst still allowing a quality of service exchange and analysis to be performed quickly and efficiently.

Preferably, assuming that the desired quality of service can be satisfied by the available quality of service, an agreed range is produced for each quality of service parameter. Where the desired quality of service is also defined by a minimum/maximum pair, this agreed range effectively represents the overlap of the desired and available ranges for that parameter (note that the agreed range may have zero width—ie the minimum and maximum limits have the same value).

In the preferred embodiment, the capability information is written in a pseudo-computer language, which is executed in order to resolve said logical expresions. The capability information is exchanged between nodes in compiled form. The compiled specifications are preferably machine-independent, and are run using a machine-dependent interpreter. This is particularly advantageous (assuming that each node in the network has the appropriate interpreter) in a heterogeneous network. Note that in a homogeneous network it would alternatively be possible not to use an interpreter, but rather to propagate a directly executable version of the capability information.

It is generally desirable to then monitor communications to ensure that they conform to the agreed range for each quality of service parameter. In this case, where the monitoring operation is being continuously performed, it is particularly advantageous to use the compiled form of the capability information, since this can be processed very quickly.

The invention further provides a method for enabling a communications system in a network including a plurality of nodes to exchange information about its capabilities to support various communications with other nodes in the network, comprising the steps of:

formulating its capability information into a message that includes at least one logical expression involving at least two or more inter-related parameters;

and transmitting the capability information message to one or more other nodes in the network.

In one preferred embodiment, a potential destination node receives said capability information message from a potential source node, and performs the steps of: comparing the capability information in said message with its own capabilities; and based on said comparison, determining whether or not communications can occur between said source and destination nodes, and if so, determining the format of the communications. The destination node may then respond to the source node indicating the determined format of the communications.

This process allows a capabilities negotiation between two end terminals. The use of the logical expressions allows capability information to be exchanged in a compact yet very powerful and flexible form, to permit the destination node to make an informed decision about the communication format to use. In the prior art by contrast, although a capability negotiation between end terminals may have determined both data rate and a compression scheme, these parameters would have been handled essentially independently.

The capability information exchange can encompass the situation where there are at least two possible communication paths between said source and destination nodes, and said format determination includes determining which communication path to use.

In another preferred embodiment, a node receives a capability information message from each of a set of nodes forming a potential route through said network, and combines said received capability information to determine the capability of the route as a whole. Generally, said capability information includes information describing the quality of service parameters provided by the route, and is used for determining whether or not to provide a communication path over said route (the node may in fact receive capability information corresponding to multiple alternative routes, and select one of these routes based on the capability information). Thus a request for a particular quality of service may be received from an application intending to initiate data communications over said network; and the requested quality of service can be compared with the exchanged capability information in order to determine whether or not the intended data communications can be supported by the network.

In the preferred embodiment, the node periodically receives updated capability information messages, and uses the information therein to update the capability of the route as a whole.

Typically the capability information includes parameters such as the data transmission rate, latency, error rate and so on; in other words, potentially any parameters which are useful for ensuring that the communications facilities provided are suitable (eg audio conferencing, file data transfer, video servers, etc). In addition, the capability information may also include parameters reflecting the particular capabilities of the end terminals (and intermediate terminals where appropriate), such as compression facilities and details of supported formats. Moreover, the capability information may also include machine performance, requested proportion of CPU time, in order to provide the most complete description possible of a node.

BRIEF DESCRIPTION OF THE DRAWINGS

A preferred embodiment of the invention will now be described in detail by way of example only with reference to the following drawings.

DETAILED DESCRIPTION OF THE INVENTION

Figure 1:
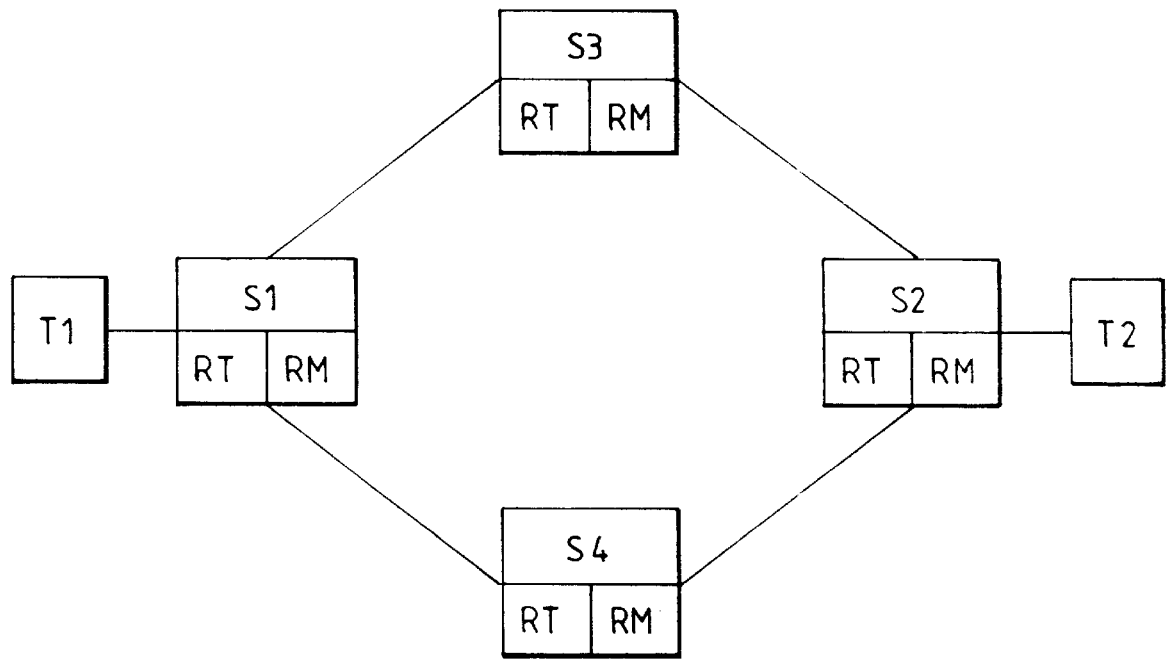
FIG. 1 is a schematic diagram of two terminals connected by an ATM network.

FIG. 1 is a schematic diagram of an ATM network, in which end terminals T1 and T2 communicate via switches S1–S4. There are two possible routes through the switch network, ie T1-S1-S3-S2-T2 or T1-S1-S4-S2-T2. The underlying ATM technology of this network will not be described in detail since it is already well-known, see for example "Asynchronous Transfer Mode: Solution for broadband ISDN" by Martin de Prycker, Ellis Horwood, UK, 1991.

In order to communicate with T2, T1 sends a request to its local switch, S1. This request typically specifies the desired quality of service from the network, including parameters such as error rate, jitter, and so on. Note that the overall quality of service parameters from T1 to T2 are not determined by a single link or switch, but rather by the cumulative effect of all the links and switches in the selected route.

The aforementioned U.S. patent application Ser. No. 08/407993 describes one method of determining the quality of service parameters along the entire route, by defining an initial vector of quality of service parameters which is then passed along the intended route, and updated as appropriate at each stage of the route to represent the effect of the preceding stages. For example, each node substracts the delay due to itself from the specified latency.

The present invention provides a different solution, whereby the different nodes in the network exchange information about their respective capabilities. In one preferred embodiment, capability information on the following quality of service parameters may be utilised:

Error: Frame error rate (eg in units/second)
Cost: Cost (eg in dollars/second)
Duration: Length of time the channel will exist (eg in seconds)
Retry: Number of error retry attempts
Size: Unit or frame size (eg in bytes)
Jitter: Jitter (eg in milliseconds)
Latency: Latency (eg in milliseconds)
Rate: Throughput (eg in units/second)

In general, each quality is specified as a minimum/maximum value pair, eg Rate[min,max]. In the preferred embodiment, a value pair specifying only a single figure is interpreted as having both minimum and maximum values equal to this figure.

Optionally, a special meaning can be given to the Retry parameter, such that Retry(min)=0 implies errors are ignored, whilst Retry(min)>0 implies an error event is raised if an error is detected. Retry(max) can then be used to specify the number of re-transmit attempts before an error action is taken.

Of course, it is not necessary to use the list of quality of service parameters presented above. Other communications systems may use different sets of parameters, perhaps a subset or superset of those above, or the definition of the parameters may be slightly varied (for example Error might be defined as the percentage of frames which were not received correctly). The choice of capability information will depend on the mode of network operation.

In order to allow for the inter-dependence of the different capability parameters, a parameter may be expressed as an algebraic function of one or more other parameters. The following table provides a simple example of the specification of parameters for a node in a communications network:

TABLE 1

Size=[48]
Rate[max]       = 8000*Size[Max]                           (Rate=[0,384000])
Latency[Min]    = 20
Latency[Max]    = 20+Rate[max]/6400                        (Latency=[20, 80])
Jitter[Max]     = Rate[max]/3200                           (Jitter=[0, 120])
Error[Max]      = 2+MAX(0, Rate[max]*(Jitter[Max]-100)/960000)
                                                           (Error=[0,10])

Each parameter is initially be set to [0,0], with updates to the minimum value producing an equivalent change to the maximum value automatically (an alternative possibility would be to allow the initial values to be undefined, and use some suitable default handling).

The motivation behind the expressions given above is roughly as follows. Firstly, the Size is set equal to 48 bytes, corresponding to ATM, whilst Rate maximum might be effectively limited by a set specified number of frames per second (dependent for example on the processing speed of the switch). There might be a fixed minimum Latency through the switch, but the maximum Latency is specified as increasing with Rate (presumably due to processing limitations). Similarly, maximum Jitter is also specified as increasing with Rate, again perhaps due to queuing and traffic concerns. Finally, the maximum Error rate is indicated as increasing sharply when Jitter goes above a set value (100 ms) (the MAX function selects the maximum of its two arguments). This might plausibly represent limited buffering capability at the switch, and some consequential packet loss at high data rates.

In the preferred embodiment, a simple language is defined for the manipulation of the above parameters, which allows for variables and constants (the parameters themselves are variables). Conventional arithmetic operations are provided—addition, subtraction, multiplication, division, plus a remainder function—along with control flow constructions (if . . . then . . . else), including normal logical tests (less than, equals, greater than, etc). Since the algebra is predominantly defined with respect to value pairs, the preferred embodiment includes logical tests for determining whether one range is exclusive or inclusive of another range.

In addition to a capabilities expression for a node, each link in the network may have its own capability expression, as illustrated in the following:

TABLE 2

Size=[32, 1024]
Rate[Max]=128000                    (Rate=[0,100])
Latency[Max]=(Size[Max]/16)]        (Latency=[0,64])
if Duration[Min] > 100 then
    Cost=8
else
    Cost=10

In this case the latency scales with the frame size, reflecting the delay associated with waiting for a frame to be completed before transmission. Note the use of a logical expression for the charging structure, such that calls which are guaranteed to be longer than a minimum Duration obtain a discount. Note also that Cost is defined as a single value (ie the minimum and maximum costs are identical). The implication of this is that the charging rate is fixed (for a given Duration).

In fact, the expression used produces the slight anomaly that the cost of calls lasting over a 100 seconds is less than the cost of calls lasting say 90 seconds. This can be avoided if a more complex expression is used for the charging formula, for example:

if Duration[Min]>100 then Cost=(1000+(8*(Duration−100)))/Duration else Cost=10

Moreover, it should be appreciated that the capability parameters do not necessarily resolve, at least initially, into fixed numerical ranges. For example, the parameter specifications in Table 2 do not limit Cost; rather they simply define a relationship between Cost and Duration. This relationship is employed if a requesting communication has a limitation on Cost for example, in which case a maximum Duration value can then be determined (the interaction between the requesting application and the communications system is discussed in more detail below). This sort of flexibility has not been available in the prior art.

Returning to FIG. 1, each switch includes a routing table (RT) and a resource manager (RM). The routing table is utilised to direct communications to any other node on the network. The routing table may be complete, describing the whole network, or partial, for example simply identifying the appropriate nearest neighbours for any given destination. A single routing table may be stored for the network, which can be remotely accessed from each switch, although more normally the routing information is at least partly replicated around the network, to improve performance and redundancy. The use of such routing tables is well-known in the art.

The resource manager maintains a record of the quality of service which can be provided by that switch, and generates an expression to describe this, such as listed in Table 1. The quality of service information for a switch can be dynamically updated by monitoring local traffic and system conditions. The resource manager is also responsible for receiving a quality of service request from a terminal, and matching this request against the available communications resources to determine whether or not the request can be satisfied or rejected.

When a terminal (T1) desires to establish communication with another terminal, it sends a request to switch S1. This request includes the desired quality of service required for the communication, which in the preferred embodiment is also expressed in the same algebraic language presented above, specifying desired Rate, Latency, and so on (the use of this algebraic language for matching requested resource to available resources is described in more detail in UK patent application 9608434.8, filed Apr. 24, 1996) The resource manager then generates an expression of the capabilities of the switch, such as indicated in Table 1 for example, which it transmits to the next switch in the selected route.

This is repeated until the final switch in the route (S2), to which the destination terminal T2 is attached, receives information specifying the requested service parameters and information specifying the capabilities or available service parameters on each of the switches and links in the route. These service parameters are all expressed in the algebraic language described above. In the preferred embodiment it is the responsibility of the resource manager at the final switch (S2) to determine whether the available parameters allow the requested parameters as specified by the requesting terminal T1 to be satisfied.

The first step in this procedure is to determine one overall expression representing the network communication capability over the relevant route. The method of combining the individual quality of service expressions varies with parameter, but generally parameters are additive (Latency, Jitter, Error, Cost), or selective (Size, Rate). In the latter case, selective combination takes the shared region or overlap of the Min/Max pairs involved (if there is no shared region, then this indicates some incompatibility within the network).

For example, the quality of service specification formed by the combination of the switch in Table 1 and the link in Table 2 gives:

TABLE 3

Size= [48]
Rate= [0, 128000]
Latency= [20,43]
Jitter= [0, 40]
Error=[0, 2]
If Duration[Min] >100 then
    Cost=8
Else
    Cost=10

Although there are various ways of performing this combination, in the preferred embodiment an iterative procedure is used, based on the expressions in Table 1 and Table 2. Thus if we write Rate1 and Rate2 for the rate in Table 1 and Table 2, with an analogous nomenclature for the other variables, then we can specify that:

Latency3=Latency1+Latency2

Rate3=Shared(Rate1, Rate2)

Rate1=Rate2=Rate3 where Latency3 is the overall combined latency, and Rate3, the combined rate, is defined as the shared region of Rate1 and Rate2. Note that Rate1 and Rate2 are then set equal to Rate3.

In the iterative procedure, the expressions in Table 1 and Table 2 are first processed to generate the values in the far right of these respective columns (the processing of these expressions is discussed in more detail below). Then, the expressions are combined as described above. Note that this gives an initial value for example of Latency3=[0, 144]. However, when the expressions of Table 1 and 2 are reprocessed with the new values of Size and Rate, which is now equal to Rate3, this reduces the overall Latency and Jitter values to those specified in Table 3. A further iteration is performed, but this does not change the values of Table 3, indicating that a final converged set of values has been obtained.

Once an overall network capability has been generated, such as in Table 3, it can then be compared against the quality of service requested for the communication by T1. As stated above, in the preferred embodiment, the requested quality of service is also represented using an algebraic expression, which is passed from S1 to S2. The requested and available parameter specifications are processed in the same manner as described above for combining the multiple switch/link capabilities. Note that this process only needs to look for shared regions (as was done for Rate), rather than having to perform any additive calculations (as was done for Latency). In fact this can be done very simply by alternatively processing the available and requested parameter specifications until convergence is reached, provided that where a parameter which has already been set is re-set, this is interpreted as implying the shared region of the original and new settings.

Of course, if a clear conflict is detected between the requested and available parameters (eg if requested Size is [512, 1024] and available size is [32, 128]), then the requested resources cannot be provided, and the communications request must be rejected. It is also conceivable that there may be a failure to converge within a predetermined number of iterations. This may be taken as an indication that the requested resources should be rejected, or alternatively a different technique might be adopted to try to match the requested and available resources. Assuming a suitable match is found, then the resource manager indicates that transmission can proceed, and an appropriate communication path is set up between the source and destination terminals along the chosen route.

After a communications link has been set up, then it is the responsibility of the resource manager typically at the network access point (ie S1 for T1) to monitor communications to ensure that the maximum/minimum specified values for that link are satisfied. Thus the instantaneous rate, jitter, latency etc are measured, and compared to the agreed quality of service parameters. If one of the parameters strays outside the defined range, then an appropriate error message can be sent.

In the preferred embodiment, the parameter language is closely modelled on Pascal, and allows functions to be defined and called. The resource manager includes a compiler which compiles the capability expressions such as in Table 1 or 2 into machine independent P-code (byte codes). This byte code can then be executed by machine-specific interpretation. It is this execution which takes the logical expressions on the left-hand side of Table 1, and from them generates the numerical ranges (where possible) of the right hand side of this table. Note that since the language for relating parameters is relatively simple in terms of available operations, both the compiler and interpreter are straightforward adaptations of conventional Pascal compilers/interpreters, which are well-known in the art.

As an alternative the quality of service parameters might simply be taken as a data input into the resource manager program (rather than being executed). However, the utilising the capability expressions as programs in compiled form is that they can be processed very quickly. This is particularly important in terms of monitoring network performance, which must be done on a regular basis, possibly for multiple links, with minimum impact on the workstation processing capability. The primary reason for interpreting the capability specifications, rather than compiling them into directly executable code, is concerned with the distributed nature of the network control in the preferred embodiment. Since the network may be heterogeneous in terms of platforms etc, it is preferred to distribute the capability expressions in machine-independent byte code, which can then be interpreted by the resource manager according to the local environment on each machine. This avoids the need for the other systems to have to re-compile the original capability expressions.

It will be appreciated that whilst as described above, the capabilities are generated along only a single route, in fact, available quality of service parameters could be generated for multiple different routes. For example, with reference to FIG. 1, switch S1 could ask for the capabilities of both routes to switch S2 to be transmitted to S2, allowing S2 to make a selection as to the best route for the communication concerned. Of course, one possibility might be for S2 to determine that the communication is best supported by using both physical routes simultaneously.

As described above, the exchange of capability information has only limited benefits over the approach described in the aforementioned U.S. patent application Ser. No. 08/407993. Effectively, the exchange of capability information allows the matching of available/requested quality of service to be performed at a single node, rather than each node en route having to perform a partial calculation.

However, the exchange of capability information has the big advantage that it does not necessarily have to be performed on a per call basis. Rather, the capability information can be shared once, and then used for multiple calls. Of course, the capability information will normally vary with network loading, and so will require dynamic updating, but this may be much less frequent than the exchange of capability information on a per call basis.

Although in this preferred embodiment, the available and requested quality of service parameters are both specified using the capability language, the communication request might simply specify the desired quality of service parameters as a set of independent single numbers (for example), or in any other suitable form. Also, the comparison of the requested and available quality of service could be performed by a variety of methods to search through the available parameter space. The search strategy could range from the simplest trial and error approach, through techniques such as genetic algorithms, to some form of mathematical optimisation (such as linear programming perhaps).

Further, although the quality of service parameters have been described primarily with respect to specifying capabilities using minimum/maximum value pairs, it will be appreciated that a variety of approaches could be adopted. In the simplest case, the parameters could be provided as single numbers, although still related by logical expressions as illustrated above. In practice, many of these numbers would be interpreted as upper limits (eg for latency, jitter, error rate, etc). However, this approach does not cater naturally for parameters such as bandwidth, for which it is often desirable to be able to specify both minimum and maximum values (although of course two separate quantities could be defined representing minimum and maximum bandwidth respectively, with a relationship that the former is no greater than the latter).

Of course, one might prefer to be able to characterise the capabilities more precisely (eg for jitter, have different limits in the positive and negative directions). In fact, the ideal is to be able to specify the complete distribution function for each parameter where appropriate. Note that since (as shown above) the parameters are interrelated, then this really requires defining an acceptable region of a multi-variate distribution. In general, however, this is intractable from a mathematical and computational perspective, so the use of the minimum/maximum pairs therefore represents an effective compromise between computational feasibility and an accurate description of capabilities.

Figure 2:
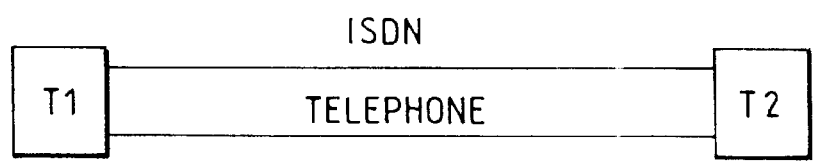
FIG. 2 is a schematic diagram of two terminals connected by an ISDN and a conventional telephone link.

A second preferred embodiment of the invention is illustrated schematically in FIG. 2, where as before terminals T1 and T2 desire to communicate. However, unlike with FIG. 1, the capabilities negotiation is now performed directly by the two terminals involved. This involves the first terminal T1 transmitting its capabilities to T2, for example using the expression provided in Table 4 below:

TABLE 4

Rate=[0, 128000]
If (Compression=COMP1) then
   begin
   Rate=Rate/2
   Latency=Rate/500
   end
elseif(Compression=COMP2) then
   Rate=Rate/4
If(Rate[Max]>20000) then
   Line=ISDN
else
   Line=PHONE For this form of capabilities exchange, the additional parameters of Compression and Line have been defined. The values of these fixed parameters are taken from a fixed set of possibilities, rather than being represented by Min/Max pairs, with ISDN and Phone (ie conventional telephone line and modem) representing supported forms of connection, and COMP1 and COMP2 representing supported compression schemes.

The expression in Table 4 provides a complete determination of the capabilities of Terminal 1. Thus the terminal can support a Rate of up to 128000 units per second, but higher rates (about 20000) require the use of an ISDN connection, whilst lower rates are available over the conventional telephone network.

In addition, the terminal provides two different forms of compression. The first of these, COMP1, provides approximately 50% reduction in data Rate, but also introduces Latency (for example, because this compression is performed in software and is relatively slow), whilst COMP2 provides an approximately 75% reduction in data Rate, with no significant impact on Latency.

On receipt of the capability information, Terminal 2 can decide whether to accept communications with Terminal 1, and if so the format to use for such communications. For example, consider that the two possible formats are data only or data plus video, where the Rate[min] for video is 64000 (by comparison we will assume that the Rate for the data communications is low). Using the capability information, if Terminal 2 does not have an ISDN connection, it is aware that it can only provide a video connection with T1 if it too supports COMP2 compression—otherwise, a data only connection should be established. On the other hand, if an ISDN line if available, but (for example) only COMP1 compression is supported, Terminal 2 can decide whether or not to use compression, based on a trade-off between higher video bandwidth and increased latency.

Thus the one-off exchange of capability information provides a very powerful mechanism for optimising communications between terminals, and avoids the need for lengthy repeated communications if the settings of multiple parameters are to be agreed. Moreover, the use of logical expressions allows capability information to be specified with much more accuracy and flexibility.

It will be appreciated that the Line information in Table 4 could instead be maintained as the capability of the various links, and then used by Terminal 2 in conjunction with the information specifically about Terminal 1. However, for simple negotiation between two terminals, as here, incorporating such information into the terminal capability information is generally more convenient. In addition, whilst the negotiation described has only involved two terminals (ie it is bilateral), it is readily apparent that the same approach could be applied to multilateral communications, for example in setting up a computer conference. In this situation typically each terminal will pass its capability information to a selected terminal, which can then determine mutually acceptable communication facilities. This involves a matching of capabilities, akin to the process described with respect to the first embodiment (of course, optionally it may be allowed to support subsets within the main conference, for example those terminals which have a video capability).

It will also be appreciated that the invention can be applied to a very broad range of networks; in fact, to any network which utilises capability negotiation and/or quality of service constraints. Some of these networks may have centralised control, where one node receives and stores capability information for all the other nodes and links, whilst others may use a distributed approach, with each network managing its own local communication resources.

Although the capabilities information described above has primarily related to quality of service parameters for network transmissions, it will be appreciated that the invention is not limited to this environment. For example, capabilities might also include processing capacity (MIP or MFLOP rate), memory requirements (in kbytes, MBytes or whatever), and so on.

What is claimed is:

1. A communications system for transmitting and/or receiving data over a network including a plurality of nodes, whereby nodes may exchange information about their capabilities to support various communications, characterized in that said capability information includes at least one logical expression involving at least two or more inter-related parameters, wherein the value of at least one of the parameters is made dependent on the value of at least one other of the parameters by the logical expression and the capability information includes a specification of a plurality of quality of service parameters provided by a node, wherein a quality of service parameter is represented as a pair of values corresponding to a minimum and maximum range, and means for receiving a requested quality of service from an application intending to initiate data communications over said network, and for using said capability information for comparing the requested quality of service with the exchanged capability information in order to determine whether or not the intended data communications can be supported by the network.

2. A method for enabling a first node in a network including a plurality of nodes to exchange information about its capabilities to support various communications with other nodes in the network, comprising the steps of:

formulating its capability information into a message that includes at least one logical expression involving at least two or more inter-related parameters, wherein the value of at least one of the parameters is made dependent on the value of at least one other of the parameters by the logical expression;

and transmitting the capability information message to one or more other nodes in the network, wherein a potential destination node receives said capability information message from a potential source node, and the destination node performing the steps of:

comparing the capability information in said message with its own capabilities;

based on said comparison, determining whether or not communications can occur between said source and destination nodes, and if so, determining the format of the communications, responding to the source node indicating the determined format of the communications;

wherein there are at least two possible communication paths between said source and destination nodes, and said format determination includes determining which communication path to use.

3. A method for enabling a first node in a network including a plurality of nodes to exchange information about its capabilities to support various communications with other nodes in the network, comprising the steps of:

formulating its capability information into a message that includes at least one logical expression involving at least two or more inter-related parameters, wherein the value of at least one of the parameters is made dependent on the value of at least one other of the parameters by the logical expression;

transmitting the capability information message to one or more other nodes in the network, wherein a second node receives a capability information message from each of a set of nodes forming a potential route through said network, and combines said received capability information to determine the capability of the entire potential route.

4. The method of claim 3, wherein said capability information includes information describing the quality of service parameters provided by the route.

5. The method of claim 3, wherein said second node utilizes the capability of the entire potential route for determining whether or not to provide a communication path over said route.

6. The method of claim 5, further comprising the steps of:

receiving a requested quality of service from an application intending to initiate data communications over said network; and comparing the requested quality of service with the exchanged capability information in order to determine whether or not the intended data communications can be supported by the network.

7. The method of claim 3, wherein said second node periodically receives updated capability information messages, and uses the information therein to update the capability of the entire potential route as a whole.

8. The method of claim 3, wherein the second node receives capability information corresponding to at least two different routes between the same source and destination, and uses said capability information to select one route from said at least two different routes.

9. The method of claim 3, wherein a logical expression in said capability information links at least two of the following parameters; data transmission rate, error rate, type of compression to be used, and latency.

10. The method of claim 3, wherein the capability information is written in a pseudo-computer language, which is executed in order to resolve said logical expressions.

* * * * *